(12) United States Patent
Vinjamuri

(10) Patent No.: US 8,474,647 B2
(45) Date of Patent: Jul. 2, 2013

(54) METALLIC LINER WITH METAL END CAPS FOR A FIBER WRAPPED GAS TANK

(75) Inventor: Gopala Krishna Vinjamuri, Woodbridge, VA (US)

(73) Assignee: Vinjamuri Innovations, LLC, Woodbridge, VA (US)

(*) Notice: Subject to any disclaimer, the term of this patent is extended or adjusted under 35 U.S.C. 154(b) by 698 days.

(21) Appl. No.: 12/028,165

(22) Filed: Feb. 8, 2008

(65) Prior Publication Data
US 2009/0200319 A1    Aug. 13, 2009

(51) Int. Cl.
F17C 1/02    (2006.01)
F17C 1/08    (2006.01)
B65D 25/34    (2006.01)

(52) U.S. Cl.
USPC .......... 220/592; 220/582; 220/586; 220/4.12; 220/62.17; 220/605; 220/626; 220/639; 220/729

(58) Field of Classification Search
USPC ................. 220/582, 586, 587, 592, 605, 626, 220/62.17, 561, 639, 643, 645, 729, 592.26, 220/4.12, 560.14
See application file for complete search history.

(56) References Cited

U.S. PATENT DOCUMENTS

| 153,634 | A | * | 7/1874 | Thompson | 89/16 |
| 382,610 | A | * | 5/1888 | Holmes | 220/586 |
| 406,886 | A | * | 7/1889 | Atwater | 220/565 |
| 795,870 | A | * | 8/1905 | Voelke | 73/322.5 |
| 1,630,037 | A | * | 5/1927 | Stresau | 220/4.12 |
| 1,795,388 | A | * | 3/1931 | Dumat | 220/592 |
| 1,925,118 | A | * | 9/1933 | Stresau | 220/587 |
| 2,105,027 | A | * | 1/1938 | Davis | 220/729 |
| 2,127,712 | A | * | 8/1938 | Bart | 220/586 |
| 2,281,407 | A | * | 4/1942 | Bohnsack | 29/460 |
| RE22,251 | E | * | 1/1943 | Stresau | 220/587 |
| 2,372,800 | A | * | 4/1945 | Stearns | 220/586 |
| 2,376,831 | A | * | 5/1945 | Stearns | 220/586 |
| 2,566,138 | A | * | 8/1951 | Osterheld | 428/649 |
| 2,629,354 | A | * | 2/1953 | Gay | 269/26 |
| 2,683,654 | A | * | 7/1954 | Bergman | 422/218 |
| 2,758,367 | A | * | 8/1956 | Dougherty | 228/173.6 |

(Continued)

FOREIGN PATENT DOCUMENTS

JP    11104762 A  *  4/1999

OTHER PUBLICATIONS

Aluminium Alloy, Wikipedia, (Dec. 12, 2010, 4:44 pm), http://en.wikipedia.org/wiki/Aluminum_alloy.*
12028165—JP11-104762_PAJ-Machine-Translation.*

(Continued)

Primary Examiner — J. Gregory Pickett
Assistant Examiner — Ned A Walker
(74) Attorney, Agent, or Firm — Louis Ventre, Jr.

(57) ABSTRACT

A metallic liner for a composite reinforced high pressure gas cylinder is composed of a seamless metal tube contoured with a top dome and bottom dome. The liner is further composed of a seamless top metal end cap having a mating shape of the top dome and a seamless bottom metal end cap having a mating shape of the bottom dome. Alternatively, an extruded cup is shaped to a dome at the open end and one or two seamless metal end caps are used. In the method of manufacturing, the top and bottom ends of the metal tube are contoured, the end caps are produced, and one or two end caps are attached to the ends of the tube.

17 Claims, 3 Drawing Sheets

U.S. PATENT DOCUMENTS

| | | | | |
|---|---|---|---|---|
| 2,848,133 | A * | 8/1958 | Ramberg | 220/590 |
| 2,864,529 | A * | 12/1958 | John | 220/729 |
| 3,010,602 | A * | 11/1961 | Randolph | 220/567.3 |
| 3,057,509 | A * | 10/1962 | Bernd | 220/591 |
| 3,079,038 | A * | 2/1963 | Rossi et al. | 220/643 |
| 3,122,000 | A * | 2/1964 | Sirocky | 62/45.1 |
| 3,137,405 | A * | 6/1964 | Richard | 220/590 |
| 3,140,006 | A * | 7/1964 | Nelson | 220/587 |
| 3,268,103 | A * | 8/1966 | Nelson | 220/586 |
| 3,294,271 | A * | 12/1966 | Fritz | 220/645 |
| 3,319,658 | A * | 5/1967 | Mercier | 138/30 |
| 3,349,940 | A * | 10/1967 | Cornelius | 220/592.19 |
| 3,447,712 | A * | 6/1969 | Galasso et al. | 220/237 |
| 3,449,182 | A * | 6/1969 | Wiltshire | 156/69 |
| 3,508,677 | A * | 4/1970 | Laibson et al. | 220/590 |
| 3,557,827 | A * | 1/1971 | Marsh | 137/590 |
| 3,604,587 | A * | 9/1971 | Pechacek | 220/587 |
| 3,662,780 | A * | 5/1972 | Marsh | 137/590 |
| 3,785,040 | A * | 1/1974 | Pechacek | 29/447 |
| 3,815,773 | A | 6/1974 | Duvall et al. | |
| 3,840,139 | A * | 10/1974 | Harmon | 220/590 |
| 3,843,010 | A * | 10/1974 | Morse et al. | 220/590 |
| 3,866,792 | A * | 2/1975 | Minke | 220/589 |
| 3,907,149 | A * | 9/1975 | Harmon | 220/590 |
| 3,920,047 | A * | 11/1975 | Mercier | 138/30 |
| 3,969,812 | A | 7/1976 | Beck | |
| 4,006,838 | A * | 2/1977 | Baumann et al. | 220/586 |
| 4,099,641 | A * | 7/1978 | Schiedat | 220/567.3 |
| 4,191,304 | A * | 3/1980 | Schiedat | 220/567.3 |
| 4,225,051 | A * | 9/1980 | Faudou et al. | 220/590 |
| 4,241,843 | A * | 12/1980 | Walker et al. | 220/4.12 |
| 4,252,244 | A * | 2/1981 | Christian et al. | 220/626 |
| 4,296,869 | A | 10/1981 | Jawad | |
| 4,313,400 | A * | 2/1982 | Walker et al. | 122/31.1 |
| 4,360,116 | A * | 11/1982 | Humphrey | 220/586 |
| 4,372,458 | A * | 2/1983 | Carlson | 220/649 |
| 4,394,931 | A * | 7/1983 | Cotgreave et al. | 220/560.11 |
| 4,438,858 | A * | 3/1984 | Grover | 220/590 |
| 4,573,603 | A * | 3/1986 | Starling et al. | 220/605 |
| 4,595,112 | A * | 6/1986 | Dubois | 220/4.13 |
| 4,596,619 | A * | 6/1986 | Marks | 156/171 |
| 4,619,374 | A * | 10/1986 | Yavorsky | 220/62.19 |
| 4,690,295 | A * | 9/1987 | Wills | 220/590 |
| 4,700,868 | A * | 10/1987 | Dirkin | 220/661 |
| 4,765,507 | A * | 8/1988 | Yavorsky et al. | 220/590 |
| 4,778,073 | A * | 10/1988 | Ehs | 220/590 |
| 4,779,757 | A * | 10/1988 | Fuckert et al. | 220/4.12 |
| 4,785,956 | A * | 11/1988 | Kepler et al. | 220/590 |
| 4,842,737 | A * | 6/1989 | Reed | 210/321.87 |
| 4,906,533 | A * | 3/1990 | Kagechika et al. | 428/651 |
| 4,925,044 | A * | 5/1990 | Hembert | 220/589 |
| 5,004,120 | A * | 4/1991 | Hembert | 220/589 |
| 5,018,638 | A * | 5/1991 | Auberon et al. | 220/590 |
| 5,287,987 | A * | 2/1994 | Gaiser | 220/589 |
| 5,287,988 | A * | 2/1994 | Murray | 220/589 |
| 5,330,091 | A * | 7/1994 | Collier et al. | 228/107 |
| 5,388,720 | A * | 2/1995 | Murphy | 220/581 |
| 5,429,845 | A * | 7/1995 | Newhouse et al. | 428/34.1 |
| 5,441,219 | A * | 8/1995 | Rauscher, Jr. | 244/135 R |
| 5,469,985 | A * | 11/1995 | Furuichi et al. | 220/632 |
| 5,476,189 | A * | 12/1995 | Duvall et al. | 220/590 |
| 5,485,736 | A * | 1/1996 | Collier et al. | 72/47 |
| 5,494,188 | A * | 2/1996 | Sirosh | 220/590 |
| 5,518,141 | A * | 5/1996 | Newhouse et al. | 220/586 |
| 5,538,680 | A * | 7/1996 | Enders | 264/516 |
| 5,568,878 | A * | 10/1996 | LeBreton | 220/62.19 |
| 5,699,930 | A * | 12/1997 | Channell et al. | 220/62.19 |
| 5,758,796 | A * | 6/1998 | Nishimura et al. | 220/590 |
| 5,819,978 | A * | 10/1998 | Hlebovy | 220/601 |
| 5,829,418 | A * | 11/1998 | Tamura et al. | 123/529 |
| 5,890,750 | A * | 4/1999 | Channell et al. | 285/321 |
| 5,938,209 | A * | 8/1999 | Sirosh et al. | 277/622 |
| 5,971,198 | A * | 10/1999 | Olinger et al. | 220/592.27 |
| 5,979,692 | A * | 11/1999 | West | 220/586 |
| 6,039,827 | A * | 3/2000 | Cramer | 156/173 |
| 6,089,399 | A * | 7/2000 | Felbaum et al. | 220/582 |
| 6,135,308 | A * | 10/2000 | Fang | 220/590 |
| 6,158,605 | A * | 12/2000 | DeLay | 220/62.17 |
| 6,171,423 | B1 * | 1/2001 | Murphy et al. | 156/172 |
| 6,186,356 | B1 * | 2/2001 | Berkley et al. | 220/582 |
| 6,190,481 | B1 * | 2/2001 | Iida et al. | 156/175 |
| 6,190,598 | B1 * | 2/2001 | Murphy et al. | 264/314 |
| 6,193,917 | B1 * | 2/2001 | DeLay | 264/46.7 |
| 6,200,692 | B1 * | 3/2001 | Tamura et al. | 428/629 |
| 6,227,402 | B1 * | 5/2001 | Shimojima et al. | 220/581 |
| 6,230,922 | B1 * | 5/2001 | Rasche et al. | 220/586 |
| 6,263,904 | B1 * | 7/2001 | Zdunek et al. | 137/375 |
| 6,290,088 | B1 * | 9/2001 | Zdunek et al. | 220/586 |
| 6,298,553 | B1 * | 10/2001 | Hlebovy | 29/890.06 |
| 6,365,227 | B2 * | 4/2002 | Zdunek et al. | 427/239 |
| 6,485,668 | B1 * | 11/2002 | Murphy et al. | 264/516 |
| 6,662,963 | B1 * | 12/2003 | Meike et al. | 220/634 |
| 6,675,831 | B2 * | 1/2004 | Sakaguchi et al. | 137/613 |
| 6,793,095 | B1 * | 9/2004 | Dulisse et al. | 220/612 |
| 6,813,819 | B2 * | 11/2004 | Siimes et al. | 29/447 |
| 6,908,006 | B2 * | 6/2005 | Sakaguchi et al. | 220/581 |
| 6,953,129 | B2 * | 10/2005 | DeLay | 220/589 |
| 7,013,925 | B1 * | 3/2006 | Saveliev et al. | 138/30 |
| 7,032,768 | B2 * | 4/2006 | Felbaum | 220/582 |
| 7,137,526 | B2 * | 11/2006 | Sakaguchi et al. | 220/601 |
| 7,255,245 | B2 * | 8/2007 | Oliveira et al. | 220/586 |
| 7,287,663 | B2 * | 10/2007 | Vandal et al. | 220/586 |
| 7,326,281 | B2 * | 2/2008 | Fujita et al. | 96/108 |
| 7,350,665 | B2 * | 4/2008 | Hembert | 220/632 |
| 7,354,495 | B2 * | 4/2008 | Carter et al. | 156/172 |
| 7,418,782 | B2 * | 9/2008 | Kimbara et al. | 29/890.03 |
| 7,556,171 | B2 * | 7/2009 | Ishimaru | 220/586 |
| 7,803,241 | B2 * | 9/2010 | Cundiff et al. | 156/155 |
| 7,810,670 | B2 * | 10/2010 | Carter et al. | 220/565 |
| 7,857,159 | B2 * | 12/2010 | Lindner | 220/586 |
| 7,918,956 | B2 * | 4/2011 | Mehta et al. | 156/172 |
| 7,946,446 | B2 * | 5/2011 | Kimbara et al. | 220/586 |
| 8,052,915 | B2 * | 11/2011 | Lungershausen | 264/516 |
| 8,141,739 | B2 * | 3/2012 | Sakaguchi et al. | 220/562 |
| 2002/0066273 | A1 * | 6/2002 | Wang | 220/4.12 |
| 2002/0088806 | A1 | 7/2002 | Takaku et al. | |
| 2003/0066836 | A1 * | 4/2003 | Sakaguchi et al. | 220/581 |
| 2003/0111473 | A1 * | 6/2003 | Carter et al. | 220/586 |
| 2003/0189053 | A1 * | 10/2003 | Felbaum | 220/582 |
| 2004/0026437 | A1 * | 2/2004 | Hembert | 220/630 |
| 2004/0035870 | A1 * | 2/2004 | Sakaguchi et al. | 220/581 |
| 2004/0104235 | A1 * | 6/2004 | Sakaguchi et al. | 220/581 |
| 2004/0104236 | A1 * | 6/2004 | Sakaguchi et al. | 220/592 |
| 2004/0182869 | A1 * | 9/2004 | Kubo et al. | 220/581 |
| 2004/0206762 | A1 * | 10/2004 | Iida et al. | 220/581 |
| 2005/0000970 | A1 * | 1/2005 | Kimbara et al. | 220/581 |
| 2005/0087537 | A1 | 4/2005 | Kimbara et al. | |
| 2005/0279743 | A1 * | 12/2005 | Lee | 220/4.12 |
| 2006/0144843 | A1 * | 7/2006 | Vandal et al. | 220/586 |
| 2006/0260376 | A1 | 11/2006 | Osame et al. | |
| 2007/0012551 | A1 * | 1/2007 | Rohwer et al. | 200/61.22 |
| 2007/0111579 | A1 * | 5/2007 | Ishimaru | 439/312 |
| 2007/0170180 | A1 * | 7/2007 | Watanabe et al. | 220/4.12 |
| 2008/0113132 | A1 * | 5/2008 | Lungershausen | 428/35.7 |
| 2008/0142523 | A1 * | 6/2008 | Sakaguchi et al. | 220/500 |

OTHER PUBLICATIONS

12028165—JP11-104762 PAJ-Machine-Translation, Apr. 1999.*
Korean Intellectual Property Office, International Search Report and Written Opinion, PCT/US2009/032995, child patent application same as this U.S. application, Sep. 10, 2009, Government Complex-Daejeon, 139, Seonsa-ro, Seo-gu, Daejeon 302-701, Republic of Korea.

* cited by examiner

METALLIC LINER WITH METAL END CAPS FOR A FIBER WRAPPED GAS TANK

FIELD OF INVENTION

In the field of high-pressure gas tanks used for the storage and transportation of compressed gases, a seamless metal liner, and method of making the liner, is disclosed for use in a fiber-wrapped composite cylinder wherein the liner includes an end cap attached to a dome end to strengthen the liner.

BACKGROUND OF THE INVENTION

A fiber-wrapped composite gas cylinder for high-pressures, also known as a filament-wound pressure vessel, essentially consists of two components: a cylindrical or spherical containment shell or liner (hereinafter primarily referred to as a "liner") and a structural composite material. The composite is a continuously wrapped fiber-resin matrix material. The liner, over which the composite is wrapped and cured in place, provides means for preventing or minimizing gas permeation through the composite. In addition, in composite cylinders with a metallic liner, the liner provides a means for load sharing with the composite.

Machine filament-winding over a liner for a pressure vessel is well known and exemplified by the present inventor's 1969 India patent (Specification 111958) for a filament winding machine. The present invention utilizes prior art for filament winding and involves only an improved and easy to manufacture liner used in a composite gas cylinder for high-pressures.

For most consumer type composite pressure vessels, generally known as compressed gas cylinders, or pressure receptacles, the metal liner is typically made of aluminum or steel. Other metals including alloys thereof have been used. Examples of other metals known for use in liners in general are stainless steel, nickel, nickel alloys, titanium, and titanium alloys. Historically steel and aluminum alloys are metals used for seamless cylinders for the storage and transportation of compressed gases. Aluminum alloy is the principal metal discussed herein because of its strength and weight characteristics make it a preferred metal of the seamless liner of the invention. However, the term metal in this disclosure is intended to be defined broadly and is not limited to aluminum alloy.

The reason composite cylinders are preferred over solid metal cylinders is that for higher pressures, the required wall thickness of the solid metal cylinder would be such that the payload fraction becomes uneconomical for transportation and for application as a fireman's back-pack and in space craft. When used for natural gas fuel tanks, metal cylinders are prone to corrosion and the risk of catastrophic failure is a serious safety issue. Failure probability and consequences tend to be unacceptable to the society.

Weight and safety issues are critical in applications for natural gas or hydrogen fuel tanks, especially for Alternate Fuel Vehicles. Over the past three decades, compressed gas cylinders made of fiber-wrapped metallic and non-metallic liners have been shown to be a solution for overcoming the weight limitation issues as well as offering improved level of safety because of corrosion resistance and a benign failure mode.

However, a fiber-wrapped composite cylinder for high-pressure compressed gas storage and transportation is costly and complicated to design, test, and manufacture in compliance with regulatory standards. The liner is a significant cost factor in the cost of the cylinder and this invention provides a means to lower costs and simplify manufacture of the liner.

Aluminum alloy liners for fiber-wrapped composite cylinders are typically manufactured from a sheet, a billet, or flow formed seamless tubing. The aluminum alloy is usually a 6000 series aluminum alloy, for example, AA6061-T6 aluminum alloy. Liners may also be made of steel and other metals with a high strength to density ratio.

In manufacturing a liner, if the starting liner material is cast billet, the billet is shaped like a log and is pre-inspected to assure that it is free from harmful defects the cast billet is placed on a conveyor belt and cut to the desired size by an automated saw. The sawn piece is called a slug and is almost the same weight and diameter as the finished product. The slug is then placed inside a die in a backward extrusion press. The press forces a punch against the slug. The metal of the slug flows backwards around the punch forming a large, hollow, cup-shaped product is what will be shaped into a liner.

The extruded cup-shape form is further drawn on a mandrel to required length and with thickened wall segment at the open end. The thickened wall segment at the open end incorporates added material to assure that the formed dome has thickness distribution to minimize stresses along the dome contour and through thickness. The thickened wall segment at each end of the tube also permits a mechanical spinning process on the thickened wall segment to form a concave end contour.

The extruded cup-shaped liner with the thickened wall segment is put through a process called heading, necking or swaging. The open end of this liner is heated and forced into a closing die to close the open end of the cup around a boss, also called a fitting. Alternatively, the open end, or both ends if tubing is used, is formed into a head by computer numerical control (CNC) mechanical spinning to a very precise contour with an extended cylindrical neck region for accommodating a boss, which is often a nozzle, flange, threaded connection, or a solid plug. The threaded connection is to permit assembly of valving, pressure regulators and safety devices. The aluminum alloy liner is then subjected to solution heat-treatment to bring the liner mechanical properties to optimum strength level. At that point, the seamless liner is finished and ready for over wrapping with composite.

For long cylinders, the standard method to make the liner is to start with a thick walled short tube, subjected to flow forming process. The short tube is fitted over a steel mandrel supported between head stock and a tail stock and made to rotate together. CNC controlled compression forces are applied by axially moving rollers in order metal to flow plastically and distribute the metal along length of the mandrel until precise required thickness is obtained. The process also provides for thicker segment each end to accommodate adequate thickness distribution in the end dome formed by metal spinning operation. The flow forming process requires enormous hydraulic pressures and hardened steel mandrel and rollers. The process tends to be very expensive and capital intensive if the production volume is small.

Welding or brazing of the liner is not permitted for regulated composite cylinders. Once formed, the liner is wrapped with high-strength composite fibers, usually resin-impregnated continuous filaments by means of winding method. Generally, the fibers used are fiberglass, KEVLAR (ARAMID), carbon, graphite, or newly developed basalt fiber. Epoxy or polyester resins are generally used as the matrix material to bind the fibers together and provide structural quality to the composite.

The detailed design and analysis process associated with a high-pressure composite cylinder is performed by iteration of design analysis and prototype testing to establish reliability of composite cylinder performance under various constraints related to fabrication, inspection, maintenance and cost of manufacturing. The choice of the liner design and manufacturing process plays an important role because the cost of a typical load-sharing seamless liner could well exceed 60% of the cost of making a composite cylinder. The design process cost, manufacturing, and Quality Assurance/Quality Control (QA/QC) testing add to the overall cost to make the composite cylinder price cost-prohibitive, particularly when compared with metallic cylinders.

The liner of the invention complies with the latest government regulations and applicable design and performance standards, which require that the liner be seamless. The invention is intended for principal application to composite cylinder designs that must be compliant with one or more of various International and United States regulatory standards.

Generally, the liner of this invention will be compliant with contemporary regulations and standards for the design, manufacturing and use of composite cylinders. Well known examples of such regulations and standards include DOT FRP-1 (Basic Requirements For Fiber Reinforced Plastic (FRP) TYPE 3FC Composite Cylinders) (re: fully over-wrapped-Glass Fiber, KEVLAR); DOT FRP-2 (Basic Requirements For Fiber Reinforced Plastic (FRP) Type 3HW Composite Cylinders (re: hoop wrapped-glass, KEVLAR); DOT CFFC (Basic Requirements For Fully Wrapped Carbon-Fiber Reinforced Aluminum Lined Cylinders (DOT-CFFC)); ISO 11119-1: 2002 (Gas cylinders of composite construction—Specification and test methods-Part 1: Hoop wrapped composite gas cylinders); ISO 11119-1: 2002 (Gas cylinders of composite construction—Specification and test methods-Part 1: Hoop wrapped composite gas cylinders); ISO 11119-2: 2002 (Gas cylinders of composite construction—Specification and test methods-Part 2: Fully wrapped fibre reinforced composite gas cylinders with load-sharing metal liners); BS EN 12245: 2002 (Transportable gas cylinders-Fully wrapped composite cylinders).

The liner of this invention has a significantly lower-cost compared to the state of the art liner for principal use in a composite reinforced vessel. In combination with the method of manufacture of the liner, an embodiment of the invention enables the use of lower-cost commercially available extruded metal tube of uniform thickness. A metal end cap for one or both ends (depending on how the cylinder is made) provides adequate thickness and bending stiffness to withstand pressure cycling related stresses and prevent fatigue failure. The metal end cap provides performance at least equivalent to that provided by prior art practice of increased wall thickness in the dome. The prior art practice requires a complex flow forming process, which is a significant cost in making the liner. The metal end cap is a precise mating part that can be slipped on or screwed on to the end dome and secured by without the use of a weld, preferably using a structural adhesive, shrink fit, a lock nut or combination of these. The method of making a liner in accordance with the invention simplifies manufacture and lowers costs of manufacture of a composite reinforced cylinder.

DESCRIPTION OF PRIOR ART

The prior art in this category relates primarily to variations in designs of a composite reinforced cylinder as opposed to just the liner, the use of non-metallic liners and various types of over-wrap fibers. The present invention deals only with metallic liners. For such liners, the prior art teaches the use of thickened liner end-domes.

A typical example of the prior art is U.S. Pat. No. 3,969,812 for a pressure vessel wherein a metallic liner in the shape of a cylindrical portion with a dome-shaped portion at each end thereof is over wrapped by a plurality of layers of resin coated, single fiberglass filaments. As part of over-wrapped pressure-vessel manufacturing, the '812 patent teaches a method of making the end portion of the liner that has a uniformly increasing thickness from the cylinder part to the neck. The need for increased thickness in the dome was determined by means of advanced stress analysis. The '812 patent teaches the neck forming method consisting of making extruded cup with an open end which is then closed to form a required contoured end by hot forming in two steps. Mechanical spinning was not discussed in the '812 disclosure. The art of making liner with uniformly increased thickness in the end dome represents the state of the art.

Although making a liner with thickened, spun end-domes from a tubular stock has not been specifically discussed in any patent, it is evident that such method is practiced worldwide for making long composite cylinders. For long cylinders, the standard method to make the liner is to start with a thick-walled short tube and subjected to flow forming process. The short tube is fitted over a steel mandrel supported between headstock and a tailstock and made to rotate together. Computer numerical controlled compression forces are applied by axially moving rollers in order metal to flow plastically and distribute the metal along length of the mandrel until precise required thickness and length is obtained. The process will also provide for thicker segment at each end to accommodate adequate thickness distribution in the end dome formed by metal spinning operation. The flow forming process requires enormous hydraulic pressures and hardened steel mandrel and rollers. The process tends to be very expensive particularly for smaller production volumes.

The prior art also teaches reinforcement for the metal dome of the liner but, the method of reinforcement is essentially the composite over wrap in layers of various fibers and filamentous fabric. Additionally, the metal liner is very thin, essentially used as a fluid permeation barrier and not for any level of load sharing. U.S. Pat. No. 3,815,773 is an example of reinforcement using fibers or fabric. While the over wrap would be used with the present invention for the manufacture of the composite cylinder, it is not part of the present invention, which is for the metal liner itself. The metal liner is notably different because, among other differences, the metal liner is manufactured with a seamless metal cap attached to the dome region to provide complimentary strength and stiffness in the dome region of a metal liner made from commercially available tubing, which is not taught in the prior art.

Prior art of pressure vessels, although not composite reinforced cylinders, includes the use of layers and stiffening plates at the end of a pressure vessel. Typical of this prior art is U.S. Pat. No. 4,296,869 for a layered head for a pressure vessel. The head includes a frame which has the general contour of the head and is formed from a plurality of stiffeners. The individual plates are welded along their peripheral edges to the stiffeners, and because of the stepped configuration of the stiffeners and the variances in the surface areas of the plates, the welds of successive plates are offset from each other. The present invention is distinct from the '869 patent in the use of a seamless dome-shaped cap placed over the contoured or hemispherical end of the liner. Additionally, each cap is preferably attached using structural adhesive, shrink fit, a lock nut or combination of these, that is, by means other than welding or brazing.

Accordingly, the present invention will serve to improve the state of the art by providing a less costly, easier to manufacture liner and process for making the liner for a composite reinforced cylinder. The present invention delivers these improvements while achieving adequate strength and bending stiffness in the dome area of the cylinder to assure optimum performance including withstanding pressurization cycles through the cylinder service life. A liner according to the invention will permit the manufacture of composite cylinders in conformance with applicable standards and complying with composite cylinder regulations applicable to storage and transportation of compressed gas.

BRIEF SUMMARY OF THE INVENTION

A metallic liner for a composite reinforced high pressure gas cylinder is composed of a seamless metal tube, preferably an aluminum alloy grade 6000 series. This tube is contoured with a top dome and bottom dome that seamlessly transition from the tube sidewall into an extended cylindrical neck. The bottom dome may seamlessly transition into an integral solid stub. The liner is further composed of a seamless top metal end cap having a mating shape of the top dome. The top metal end cap is attached to the top dome. Finally, the liner composed of a seamless bottom metal end cap having a mating shape of the bottom dome. The bottom metal end cap is attached to the bottom dome.

Alternatively, an extruded cup is shaped to a dome at the open end and one or two seamless metal end caps are used.

In the preferred method of manufacturing, the top and bottom ends of the metal tube are contoured using a computer numerical control mechanical spinning and forming process, the end caps are produced by cold forging, hydro forming, spinning or a combination thereof, and the end caps are attached to the top and bottom ends using structural adhesive, shrink fit, threaded connection, a lock nut or combination of these.

BRIEF DESCRIPTION OF THE DRAWINGS

The reference numbers in the drawings are used consistently throughout. New reference numbers in FIG. 2 are given the 200 series numbers, in FIG. 3 are given 300 series numbers, in FIG. 4 are given 400 series numbers, and in FIG. 5 are given the 500 series numbers.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

Figure 1:
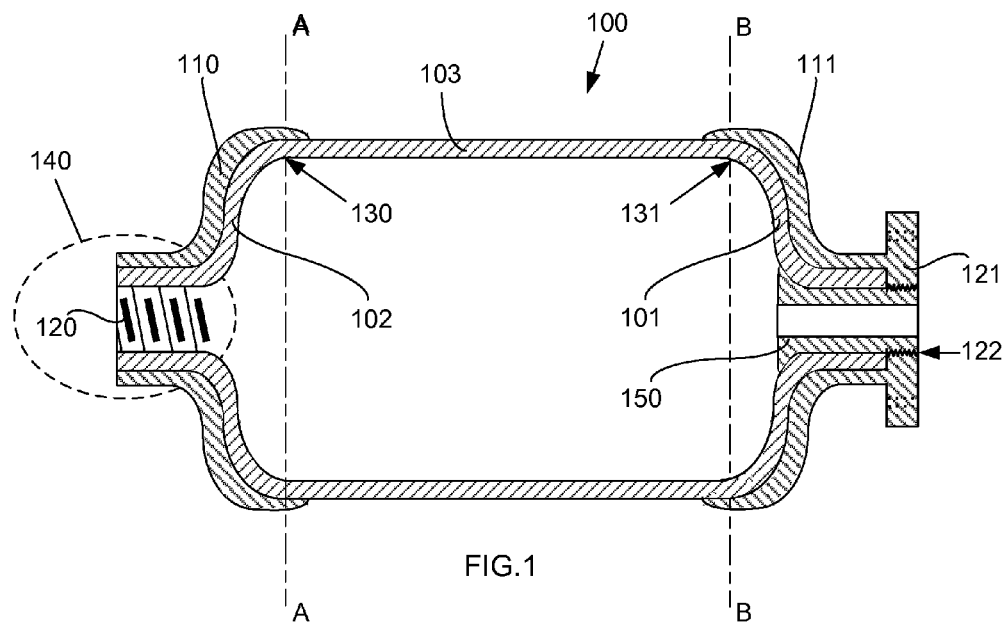
FIG. 1 is a sectional side view of a preferred embodiment of the liner derived from a metal tube.

FIG. 1 shows a sectional side view of a preferred embodiment of the liner (100) for a composite cylinder for high-pressure gas storage and transportation. A liner preferable includes three elements: a metal tube, a top metal end cap and a bottom metal end cap.

The first element of this embodiment is a metal tube of uniform thickness and uniform diameter. The metal tube comprises three portions: a sidewall (103), a top end (102) to the left of the line A-A, and a bottom end (101) to the right of line B-B.

The top end (102) is contoured to form a top dome that seamlessly transitions from the sidewall (103) beginning at location (130) to form an extended cylindrical neck, which is shown in the dashed oval (140).

The extended cylindrical neck preferably has internal threads (120), that is, threads within the extended cylindrical neck. Alternatively, the extended cylindrical neck may also have external threads (220). The threads, whether internal or external, permit attaching an end cap, fitting or appurtenance.

Figure 3:
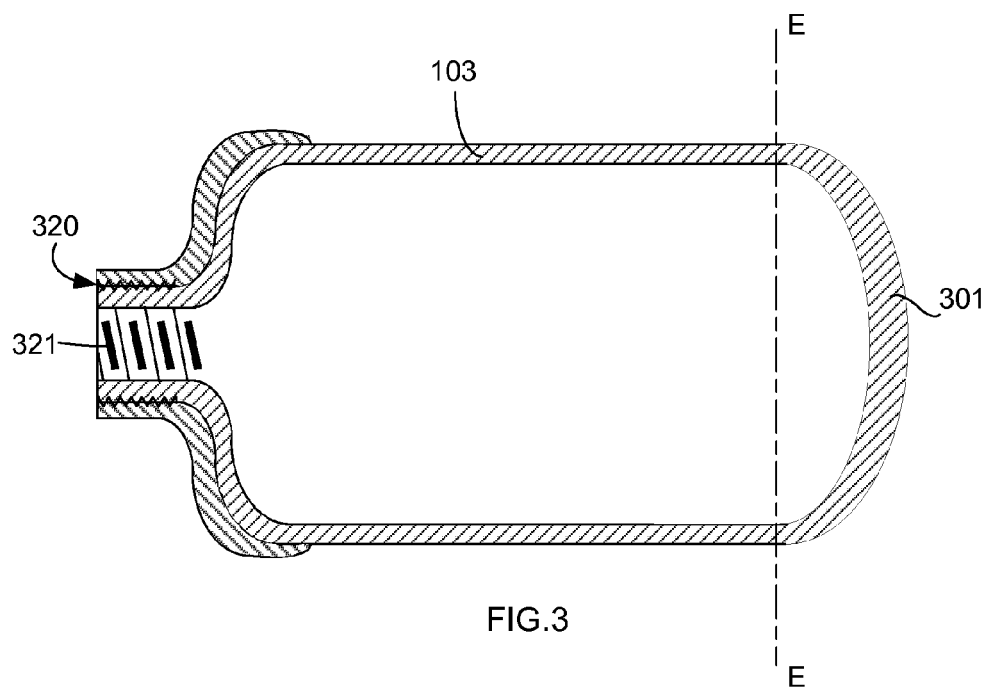
FIG. 3 is a sectional view of a preferred embodiment of the liner having a thickened bottom end derived from an extruded slug.
Figure 4:
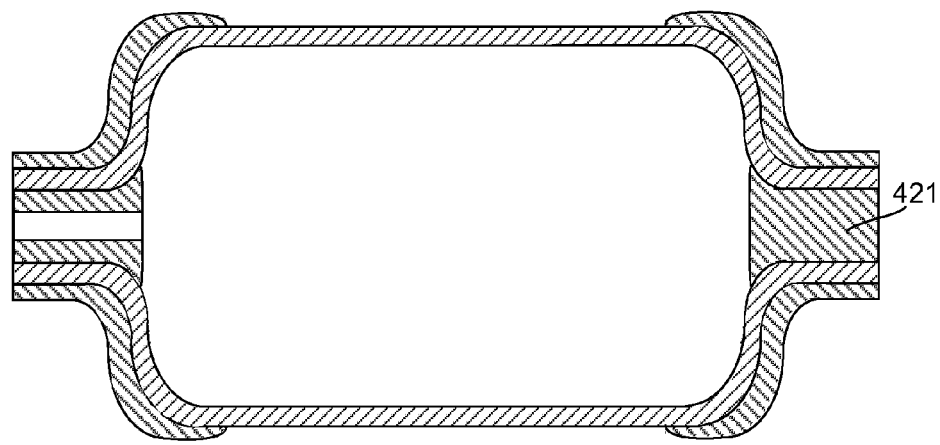
FIG. 4 is a sectional view of a preferred embodiment of the liner derived from a metal tube with a plug at the bottom end.

Typical fittings for internal or external threads include, a valve, pressure regulator, stub, or end plug to terminate the opening. In addition, an external thread may be used with a lock nut (211) to secure an end cap, or the end cap itself may be threaded to mate with them as shown at (320) in FIG. 3. Optionally, the cylindrical neck surrounds a boss, that is, an embedded fitting, such as the solid boss (421), as shown in FIG. 4.

The bottom end (101) is contoured to form a bottom dome that seamlessly transitions from the sidewall (103) to form an extended cylindrical neck. The extended cylindrical neck of the bottom end shown in FIG. 1 has external threads that mate (122) with threads on an end cap (121) shaped with a flange. Alternative arrangements are possible such as a two-part flange with the external flat face screwed into the part embedded within the extended cylindrical neck. A flange facilitates connecting multiple cylinders in series, that is, a tandem connection of cylinders to extend volume capacity.

The second element of the liner is a top metal end cap (110) having a mating shape of the top dome. The top metal end cap (110) is attachable to the top dome. The top metal end cap preferably has a neck of same length as that of the extended cylindrical neck of the liner. However, it is not required that the end cap rise to the end of the extended cylindrical neck, as shown in the embodiment illustrated in FIG. 2 where the top metal end cap (210) rises partly up the extended cylindrical neck. Preferably, the top metal end cap (110) also covers the start of the seamless transition from the sidewall, and thus would preferably cover at least the entire top end (102).

The top metal end cap (110) is of seamless construction, that is, it is a single integral piece of metal with no welds or seams of any kind. Optionally, the top metal end cap (210) has internal threads shown in FIG. 3 at (320) mating with external threads on an extended cylindrical neck.

The third element of the liner is a bottom metal end cap (111) having a mating shape of the bottom dome. The preferences and options for the bottom metal end cap (111) parallel those of the top metal end cap (110). FIG. 1 shows an optional fitting embedded within the extended cylindrical neck, which is shown as a flange (121). Optional embedded fittings are well known in the art and other examples include a nozzle (150) and a plug. A plug is a solid boss (421), as shown in FIG. 4.

The bottom metal end cap (111) is of seamless construction, that is, it is a single integral piece of metal with no welds or seams of any kind.

The preferred metal for the metal tube, the top metal end cap (110), and the bottom metal end cap (111) is 6000 series aluminum alloy. Dissimilar metals may be used for each of these three elements, recognizing that dissimilar metals may involve deleterious effects from galvanic action.

In the method of making the liner of shown in FIG. 1, the following steps which are numbered for convenience of description, are performed in any order resulting in a finished product:

A first step is contouring the top end (102) of the metal tube to form a top dome that seamlessly transitions from the sidewall into an extended cylindrical neck and is preferably accomplished by spinning the metal tube using a computer numerical control mechanical spinning and forming process.

Contouring, by spinning the metal tube using a computer numerical control mechanical spinning and forming process, is well known in the art. The preferred method of contouring is to spin form the ends of extruded, or flow formed open-ended tubing to contain required contour and extended cylindrical neck. The spun end of the cylindrical liner has a thickness determined by the spinning process. The spinning process is by a computer-numerical-control mechanical-spinning machine, or hot forming in a form-die. In the manufacturing the top and bottom add on end caps, the preferred method is by CNC spinning machine.

A second step is contouring the bottom end (101) of the metal tube to form a bottom dome that seamlessly transitions from the sidewall and to embed a fitting therein.

A third step is shaping metal to form the bottom metal end cap (1111). This step is preferably performed by any method that will result in a seamless integral bottom metal end cap (111). Examples of such methods include cold forging, hydro forming, and spinning, all of which are well known in the art.

A fourth step is shaping metal to form the top metal end cap (110). This step is preferably performed by any method that will result in a seamless integral top metal end cap (110). Examples of such methods include cold forging, hydro forming, and spinning, all of which are well known in the art.

A fifth step is attaching the bottom metal end cap (111) to the bottom end (101). Attaching the bottom metal end cap (111) to the bottom end (101) is preferably achieved using a structural adhesive placed between the bottom metal end cap and the bottom end (101). Structural adhesives are well known in the art. Alternatively, attaching the bottom metal end cap (111) to the bottom end (101) may be by shrink fitting the bottom metal end cap (111) to the bottom end (101). Shrink fitting is well known in the art. A combination of adhesives and shrink fitting may also be used.

A sixth step is attaching the top metal end cap (110) to the top end (102). Here again, attaching the top metal end cap (110) to the top end (102) is preferably achieved using an adhesive placed between the top metal end cap (110) and the top end (102) and may also involve shrink fitting the top metal end cap (110) to the top end (102).

An optional step comprises heat treating both the metal tube and end cap of same materials simultaneously under same process control in a common furnace. When the tube material and the end cap are of different materials, the heat treatment process is to achieve compatible mechanical properties, without compromising the fit of the mating surfaces of the tube and end cap.

Figure 2:
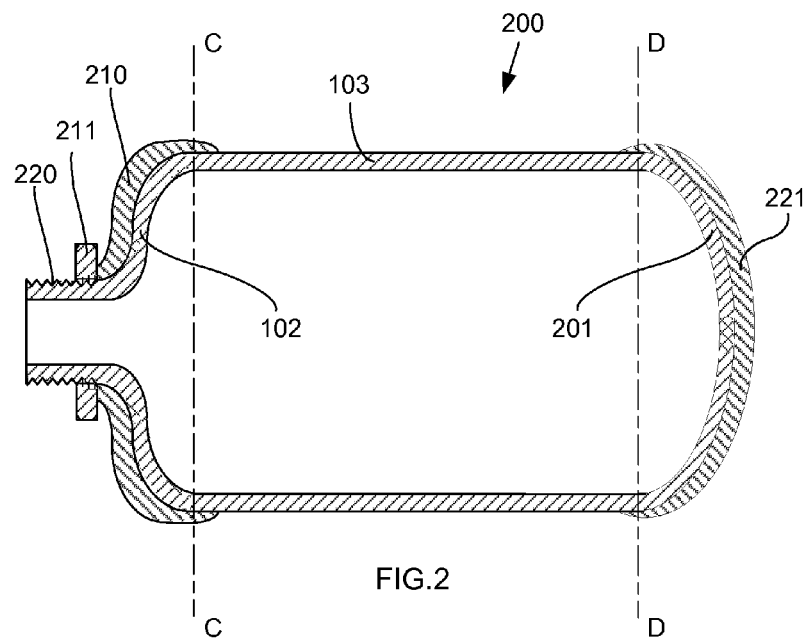
FIG. 2 is a sectional view of an alternative preferred embodiment of the liner of uniform thickness derived from an extruded slug.

FIG. 2 shows a sectional view of an alternative preferred embodiment of the liner (200) of derived from an extruded slug. A significant difference from the embodiment shown in FIG. 1 is a closed bottom dome (201) shown to the right of line D-D.

In this embodiment a cup formed by extrusion and, just as described above for FIG. 1, it has a uniform-thickness seamless sidewall (103), a top end (102) that is open and of the same thickness as the sidewall (103). The significant difference is that extrusion forms a seamless, closed bottom dome (201) that is preferably approximately hemispherical, but may have other contours. While the closed bottom dome (201) shown in FIG. 2 has the same thickness as the sidewall (103), FIG. 3 shows a closed bottom dome (301) to the right of the line E-E having a greater thickness than the sidewall (103). The greater thickness of the closed bottom dome (301) of FIG. 3 eliminates the need for a bottom end cap.

As with the embodiment described for FIG. 1, the top end (102) of the metal cup is contoured to form a top dome, which is shown in FIG. 2 to the left of line C-C, that seamlessly transitions from the sidewall to form an extended cylindrical neck. Optionally, the extended cylindrical neck surrounds an embedded fitting. In FIG. 2, the extended cylindrical neck has external threads (220) and a threaded lock nut (211) secures the top end cap (210) in place.

The bottom end cap (221) of FIG. 2 is different from that described above for FIG. 1 in that there is no fitting. In FIG. 2, the bottom end cap (221) has a mating shape of the closed bottom dome (201), which encompasses the portion of the liner to the right of line D-D. The bottom end cap (221) is attached to the closed bottom dome (201) so as to cover at least the entire closed bottom dome (201).

Figure 5:
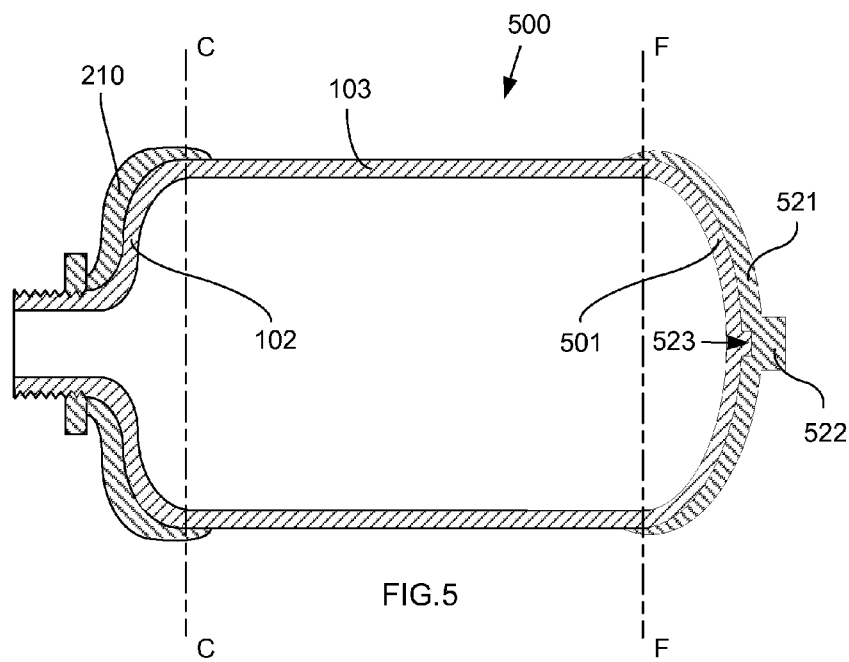
FIG. 5 is a sectional view of a preferred embodiment of the liner closed to a stub at the bottom end.
Figures 6, 7, 8:
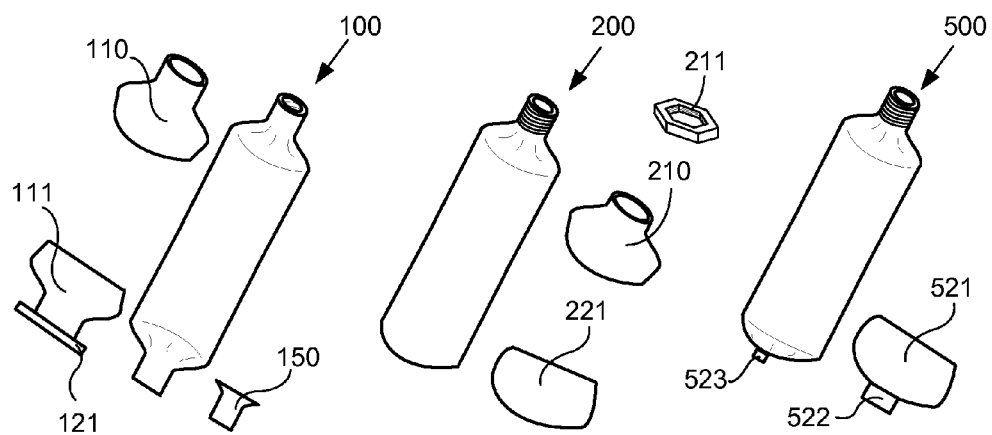
FIG. 6 is a perspective of the separated components of the embodiment shown in FIG. 1.
FIG. 7 is a perspective of the separated components of the embodiment shown in FIG. 2.
FIG. 8 is a perspective of the separated components of the embodiment shown in FIG. 5.

FIG. 5 represents an alternative embodiment wherein the tube is spun closed with a seamless solid central stub (523) protruding from the closed bottom dome. The seamless integral solid central stub (523) is typically formed by mechanical spinning and forming process, which creates an integral solid central stub (523) at the apex of the closed bottom dome. The intense pressure applied in the mechanical spinning and forming process fuses the open end into a seamless integral solid central stub (523).

The embodiment in FIG. 5 is similar to the embodiment described for FIG. 1 in that this embodiment is a liner for a composite reinforced high pressure gas tank that comprises a seamless metal tube, a top metal end cap and a bottom metal end cap. For the embodiment shown in FIG. 5, the seamless metal tube comprises a sidewall (103), a top end (102) and a bottom end (501). The top end (102) is contoured to form a top dome that seamlessly transitions from the sidewall into an extended cylindrical neck. The bottom end (501), shown to the right of the line F-F, is contoured to form a closed bottom dome that seamlessly transitions from the sidewall (103) into a seamless integral solid central stub (523). The top metal end cap (210) has a mating shape of the top dome and is attached to the top dome. The top metal end cap (210) is of seamless construction. The bottom metal end cap (521) has a mating shape of the closed bottom dome and is attached to the closed bottom dome. The bottom metal end cap is of seamless construction. The mating shape necessarily includes an integral stub cover (522) that also facilitates filament winding.

The above-described embodiments including the drawings are examples of the invention and merely provide illustrations of the invention. Other embodiments utilizing the inventive concept will be obvious to those skilled in the art. Thus, the scope of the invention is determined by the appended claims and their legal equivalents rather than by the examples given.

What is claimed is:

1. A liner for a composite reinforced high pressure gas tank comprising:

a metal tube that is seamless and integrally formed as a single unitary base piece, comprising:
  a cylindrical sidewall having a substantially constant diameter;
  a top end comprising:
    a top transition zone contoured to seamlessly transition between the cylindrical sidewall and the extended cylindrical neck,
    an extended cylindrical neck with an opening, and
    a substantially variable diameter narrowing along said top transition zone from the cylindrical sidewall to the extended cylindrical neck; and,
  a bottom end having a bottom transition zone contoured to seamlessly transition from said cylindrical sidewall to a distal end;
a seamless top metal end cap integrally formed as a first single unitary overlay piece, said top metal end cap comprising an inner surface and an outer surface with solid metal therebetween, wherein the entire inner surface is in direct contact with the top end, wherein the top metal end cap overlays the top transition zone and a top portion of said cylindrical sidewall; and,
a seamless bottom metal end cap integrally formed as a second single unitary overlay piece, said bottom metal end cap overlays the bottom end and a bottom portion of said cylindrical sidewall.

2. The liner of claim 1, wherein the extended cylindrical neck has internal threads.

3. The liner of claim 1, wherein the extended cylindrical neck has external threads.

4. The liner of claim 1, wherein the extended cylindrical neck has external threads and the top metal end cap has internal threads to mate with the external threads.

5. The liner of claim 1, wherein the metal tube, the top metal end cap, and the bottom metal end cap are made of 6000 series aluminum alloy.

6. The liner of claim 1, wherein the distal end of said bottom end comprises an integral solid central stub.

7. The liner of claim 1, wherein said distal end of said bottom end is a bottom dome.

8. The liner of claim 1, wherein said distal end of said bottom end is a second extended cylindrical neck configured with an opening.

9. The liner of claim 8, wherein the second extended cylindrical neck has external threads and the bottom metal end cap has internal threads to mate with the external threads.

10. The liner of claim 8, further comprising an a top embedded fitting surrounded by the extended cylindrical neck of the top end and a bottom embedded fitting surrounded by the second extended cylindrical neck, said top embedded fitting and said bottom embedded fitting each selected from a group consisting of a nozzle, a flange, a solid plug and a threaded connection.

11. The liner of claim 8, wherein the second extended cylindrical neck has internal threads.

12. The liner of claim 8, wherein the second extended cylindrical neck has external threads.

13. A method of making the liner of claim 1, comprising the steps of:
  contouring the top end of the metal tube to seamlessly transition from the cylindrical sidewall into the extended cylindrical neck to create the top transition zone;
  contouring the bottom end of the metal tube to seamlessly transition from the cylindrical sidewall to the distal end to create the bottom transition zone;
  shaping metal to integrally form the seamless bottom metal end cap as the second single unitary overlay piece;
  shaping metal to integrally form the seamless top metal end cap as the first single unitary overlay piece;
  attaching the bottom metal end cap to the bottom end of said metal tube; and,
  attaching the top metal end cap to the top end of said metal tube.

14. The method of claim 13, wherein the step of contouring the top end of the metal tube, and the step of contouring the bottom end of the metal tube are accomplished by spinning the metal tube using a computer numerical control mechanical spinning and forming process.

15. The method of claim 13, wherein the step of shaping metal to integrally form the seamless bottom metal end cap and the step of shaping metal to integrally form the seamless top metal end cap are performed by a metal shaping method selected from a group consisting of cold forging, hydro forming, and spinning.

16. The method of claim 13, wherein the step of attaching the bottom metal end cap to the bottom end of said metal tube and the step of attaching the top metal end cap to the top end of said metal tube are achieved by an attachment means selected from a group consisting of bonding complementary parts together with a structural adhesive; shrink fitting complementary parts together; threading complementary parts together; and fastening complementary parts together with a lock nut.

17. The method of claim 13, further comprising the step of heat treating the metal tube, the top metal end cap, and the bottom metal end cap with common materials simultaneously under a common process control in a common furnace.

* * * * *